(12) United States Patent
Ishigooka et al.

(10) Patent No.: US 12,103,546 B2
(45) Date of Patent: Oct. 1, 2024

(54) VEHICLE CONTROL DEVICE

(71) Applicant: Hitachi Astemo, Ltd., Hitachinaka (JP)

(72) Inventors: Tasuku Ishigooka, Tokyo (JP);
Nobuyasu Kanekawa, Tokyo (JP);
Tomohito Ebina, Hitachinaka (JP);
Kazuyoshi Serizawa, Hitachinaka (JP);
Tatsuya Horiguchi, Tokyo (JP)

(73) Assignee: Hitachi Astemo, Ltd., Ibaraki (JP)

(*) Notice: Subject to any disclaimer, the term of this patent is extended or adjusted under 35 U.S.C. 154(b) by 270 days.

(21) Appl. No.: 17/799,407

(22) PCT Filed: Dec. 18, 2020

(86) PCT No.: PCT/JP2020/047350
§ 371 (c)(1),
(2) Date: Aug. 12, 2022

(87) PCT Pub. No.: WO2021/166411
PCT Pub. Date: Aug. 26, 2021

(65) Prior Publication Data
US 2023/0339484 A1    Oct. 26, 2023

(30) Foreign Application Priority Data

Feb. 21, 2020 (JP) ................... 2020-028833

(51) Int. Cl.
*B60W 50/035* (2012.01)
*B60W 60/00* (2020.01)
(Continued)

(52) U.S. Cl.
CPC ........ *B60W 50/035* (2013.01); *B60W 60/001* (2020.02); *G06F 1/324* (2013.01);
(Continued)

(58) Field of Classification Search
CPC . B60W 50/035; B60W 60/001; G06F 1/3243; G06F 1/324; G06F 15/7814; G06F 1/3287; Y02D 10/00
See application file for complete search history.

(56) References Cited

U.S. PATENT DOCUMENTS

2011/0009155 A1    1/2011  Choumaru et al.
2013/0318380 A1   11/2013  Behrens et al.
(Continued)

FOREIGN PATENT DOCUMENTS

JP    2009-282629 A   12/2009
JP    5195902 B2       5/2013
(Continued)

*Primary Examiner* — Rodney A Butler
(74) *Attorney, Agent, or Firm* — Volpe Koenig

(57) ABSTRACT

Provided is a vehicle control device capable of executing control processing by utilizing a power saving execution determination unit that determines a shift to or a release from a normal mode to a power saving mode on the basis of a preset power saving condition, and a power saving execution unit that executes power saving control of the CPU by determining a shift to the power saving mode and stops the power saving control of the CPU by determining a release of the power saving mode. Then, the power saving execution determination unit has a plurality of power saving conditions, determines to shift to the power saving mode in a case where all of the plurality of power saving conditions are satisfied, and determines to release the power saving mode in the case of being changed to a state in which some of the power saving conditions are not satisfied.

13 Claims, 25 Drawing Sheets

(51) Int. Cl.
  *G06F 1/32* (2019.01)
  *G06F 1/3234* (2019.01)
  *G06F 1/324* (2019.01)
  *G06F 1/3287* (2019.01)
  *G06F 15/78* (2006.01)

(52) U.S. Cl.
  CPC .......... *G06F 1/3243* (2013.01); *G06F 1/3287* (2013.01); *G06F 15/7814* (2013.01)

(56) References Cited

U.S. PATENT DOCUMENTS

2016/0292120 A1 10/2016 Sato
2020/0269876 A1 8/2020 Ando

FOREIGN PATENT DOCUMENTS

| JP | 2015-55947 A | 3/2015 | |
|---|---|---|---|
| JP | 2016-4383 A | 1/2016 | |
| JP | 2016-181168 A | 10/2016 | |
| JP | 2016-189049 A | 11/2016 | |
| WO | WO-2013183239 A1 * | 12/2013 | ............. B60K 35/00 |
| WO | 2019/092961 A1 | 5/2019 | |
| WO | 2020/035491 A1 | 2/2020 | |

* cited by examiner

| NUMBER OF RECOGNIZED OBJECTS | ESTIMATED CPU LOAD | POWER SAVING |
|---|---|---|
| 3 OR LESS | LOW | POSSIBLE |
| EXCEEDING 3 | HIGH | IMPOSSIBLE |

| TRAFFIC VOLUME | ESTIMATED CPU LOAD | POWER SAVING |
|---|---|---|
| A OR LESS | LOW | POSSIBLE |
| EXCEEDING A | HIGH | IMPOSSIBLE |

| POWER SAVING | CPU FREQUENCY |
|---|---|
| POSSIBLE | 0.8GHz |
| IMPOSSIBLE | 1.5GHz |

FIG. 16

| POWER SAVING | EXECUTION CPU OF AUTOMATIC DRIVING APPLICATION |
|---|---|
| POSSIBLE | ENERGY-SAVING CPU |
| IMPOSSIBLE | HIGH-PERFORMANCE CPU |

| OWN VEHICLE SPEED | GRACE TIME UNTIL COLLISION | POWER SAVING |
|---|---|---|
| 5km/h OR LESS | LONG | POSSIBLE |
| EXCEEDING 5km/h | SHORT | IMPOSSIBLE |

| OTHER-VEHICLE SPEED | SITUATION CHANGE | POWER SAVING |
|---|---|---|
| 5km/h OR LESS | NONE | POSSIBLE |
| EXCEEDING 5km/h | PRESENT | IMPOSSIBLE |

| POWER SAVING | EXECUTION FUNCTION | CPU FREQUENCY |
|---|---|---|
| POSSIBLE | LIMITED | 0.8GHz |
| IMPOSSIBLE | FULL | 1.5GHz |

| POWER SAVING | CONTROL CYCLE | CPU FREQUENCY |
|---|---|---|
| POSSIBLE | 300ms | 0.8GHz |
| IMPOSSIBLE | 100ms | 1.5GHz |

403

VEHICLE CONTROL DEVICE

TECHNICAL FIELD

The present invention relates to a vehicle control device.

BACKGROUND ART

The automatic driving system includes a plurality of electronic control units (ECU), and includes, for example, an ECU that recognizes an external environment such as a camera, an automatic driving ECU that determines a traveling route on the basis of recognized external environment information, and an actuator ECU that controls a steering or the like to cause a vehicle to travel on the basis of the determined route.

In the automatic driving ECU, an enormous calculation capability is required for processing of integrating recognition processing results of external environments recognized from a plurality of sensor devices and processing of generating a route, and thus a microcontroller having high calculation performance is employed. However, these microcontrollers have a problem of large power consumption, and a power saving technology is required.

Microcontrollers in recent years have power saving means. One of them is dynamic voltage and frequency scaling (DVFS) that can dynamically change the frequency of the CPU. In this power consumption means, the processing performance is reduced by reducing the CPU frequency, but the power consumption can be reduced.

In addition, the microcontrollers in recent years have a hetero-multi-CPU configuration in which two or more different CPUs are mounted, and both a CPU focusing on performance and a CPU suitable for power saving are mounted. The latter power saving CPU has a feature of low calculation performance but low power consumption as compared with the former CPU focusing on performance. Therefore, the power consumption can be suppressed by operating the function related to the automatic driving by the latter power saving CPU.

The automatic driving ECU has a feature that required calculation performance increases as the number of objects to be recognized around the own vehicle increases in order to travel according to the external environment. When the required calculation performance exceeds the allowable operation amount of the microcontroller, there is a possibility that the control quality cannot be guaranteed because the control processing does not end within a time constraint.

CITATION LIST

Patent Literature

PTL 1: JP 5195902 B2

SUMMARY OF INVENTION

Technical Problem

According to the technique described in PTL 1, in a case where a condition that a function with high power consumption is not used is satisfied for a certain period of time, the power consumption can be reduced by reducing the frequency of the CPU using the function. However, in PTL 1, since one condition for release is determined, there is a possibility that a timing at which the release condition is satisfied is missed. When the release condition is overlooked, there is a problem that the control processing of the automatic driving controller cannot be guaranteed. Furthermore, the timing to release the power saving mode needs to be defined in consideration of the longest time required from the release determination to the return to the original calculation performance.

The present invention has been made to solve the above problems, and an object of the present invention is to provide a vehicle control device capable of appropriately determining the timing of releasing the power saving of the CPU and completing the release of the power saving mode of the CPU so that the control processing by the CPU satisfies the time constraint.

Solution to Problem

A vehicle control device of the present invention for solving the above problems is a vehicle control device having a CPU, the vehicle control device including: a power saving execution determination unit configured to determine a shift to or a release from a normal mode to a power saving mode in which power saving of the CPU is performed on a basis of a preset power saving condition; and a power saving execution unit configured to execute power saving control of the CPU by determining the shift to the power saving mode, and stop the power saving control of the CPU by determining the release of the power saving mode. The power saving execution determination unit has a plurality of power saving conditions, and determines to shift to the power saving mode when all of the plurality of power saving conditions are satisfied, and determines to release the power saving mode when a state in which all of the plurality of power saving conditions are satisfied changes to a state in which at least some of the power saving conditions are not satisfied.

Advantageous Effects of Invention

According to the present invention, it is possible to perform the control processing such that the CPU satisfies the time constraint while using the power saving means of the CPU, and it is possible to achieve both safety and power saving of the automatic driving system.

Other features of the invention will be clear from the description and the accompanying drawings. In addition, objects, configurations, and effects besides the above description will be apparent through the explanation on the following embodiments.

BRIEF DESCRIPTION OF DRAWINGS

FIG. 3 is an example of a relationship table between the number of recognized objects and an estimated CPU load according to the first and second embodiments.

FIG. 4 is an example of a relationship table between a traffic volume and an estimated CPU load according to the first and second embodiments.

FIG. 5 is an example of a relationship table between a power saving determination result and a CPU frequency according to the first embodiment.

FIG. 16 is an example of a relationship table between a power saving determination result and a CPU executing an automatic driving application according to the second embodiment.

FIG. 21 is an example of a relationship table of an own vehicle speed and a grace time until collision according to the third embodiment.

FIG. 22 is an example of a relationship table between other-vehicle speed and a situation change according to the third embodiment.

FIG. 23 is an example of a relationship table among a power saving determination result, an execution function, and a CPU frequency according to the third embodiment.

DESCRIPTION OF EMBODIMENTS

The present invention relates to a power saving technology of a driving assistance system or an automatic driving system including a detection unit that estimates an external situation around an own vehicle on the basis of, for example, recognition information of the own vehicle or a vehicle other than the own vehicle. A vehicle control device 1 according to the present embodiment determines a shift to or a release from a power saving mode on the basis of relationship information between the situation of an external environment around the own vehicle and an estimated value of the necessary CPU calculation amount, and gives an instruction at the timing when the control processing of the shift or the release is finished within a deadline, that is, before the CPU load exceeds 100% even during the instruction of the shift or the release. By performing power saving of the CPU based on the instruction, both safety and power saving of the automatic driving system can be achieved.

Hereinafter, embodiments of the present invention will be described in detail with reference to the drawings.

First Embodiment

Figure 1:
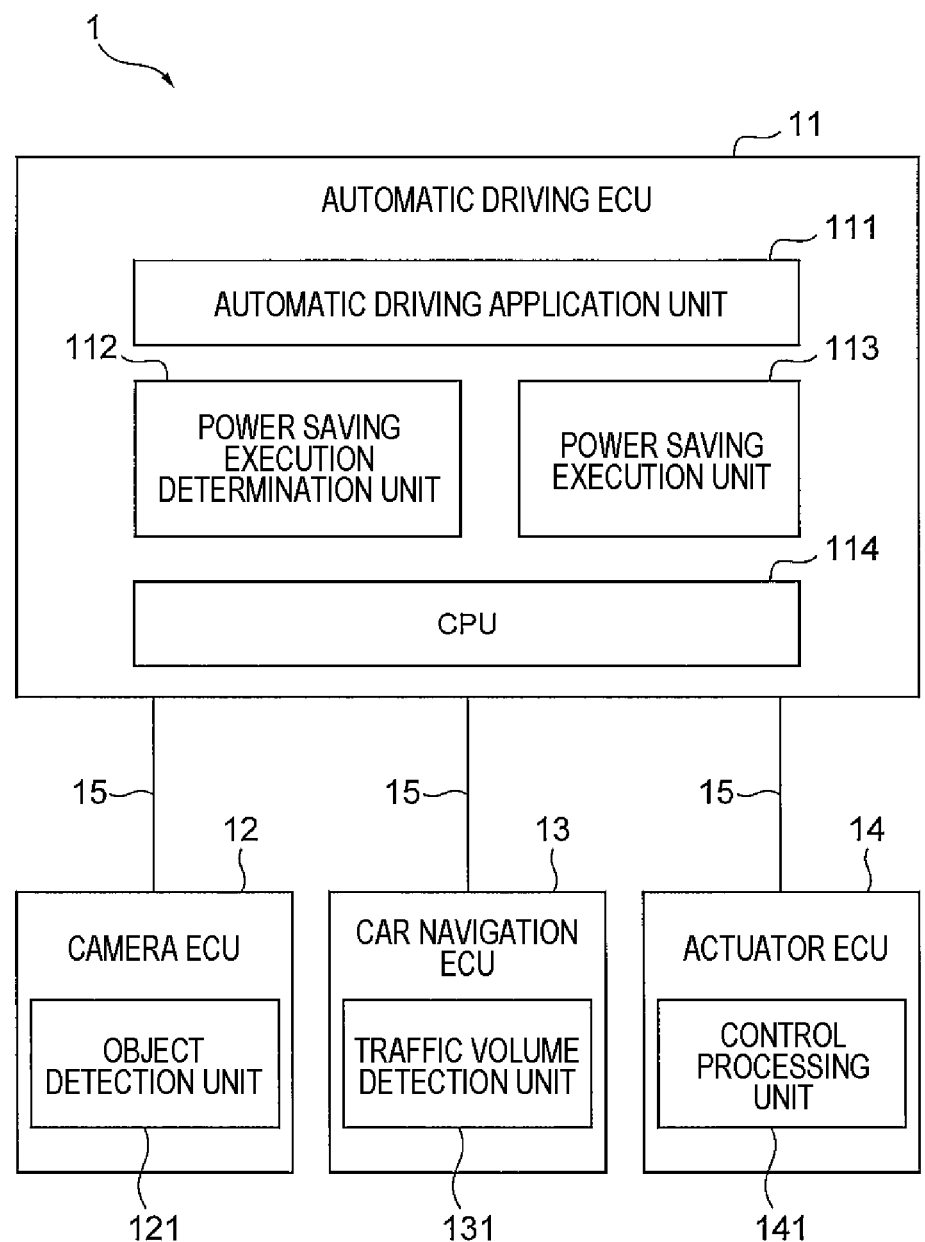
FIG. 1 is a configuration diagram of a system and a vehicle control device according to a first embodiment.

FIG. 1 is a configuration diagram of a system and a vehicle control device according to a first embodiment of the present invention. The vehicle control device 1 of the automatic driving system includes an automatic driving ECU 11, a camera ECU 12, a car navigation ECU 13, and an actuator ECU 14. Each ECU is connected to automatic driving ECU 11 via network 15. The automatic driving ECU 11 includes an automatic driving application unit 111, a power saving execution determination unit 112, a power saving execution unit 113, and a CPU 114. The camera ECU 12 includes an object detection unit 121, the car navigation ECU 13 includes a traffic volume detection unit 131, and the actuator ECU 14 includes a control processing unit 141.

The power saving execution determination unit 112 performs processing of determining a shift to or a release from the normal mode to the power saving mode for performing power saving of the CPU 114 on the basis of a preset power saving condition. The power saving execution unit 113 performs the power saving control of the CPU 114 by determining the shift to the power saving mode, and performs the processing of stopping the power saving control of the CPU 114 by determining the release of the power saving mode. Then, the power saving execution determination unit 112 has a plurality of power saving conditions, determines to shift to the power saving mode in a case where all of the plurality of power saving conditions are satisfied, and determines to release the power saving mode in a case where a state in which all of the plurality of power saving conditions are satisfied is changed to a state in which at least some of the power saving conditions are not satisfied.

Figure 2:
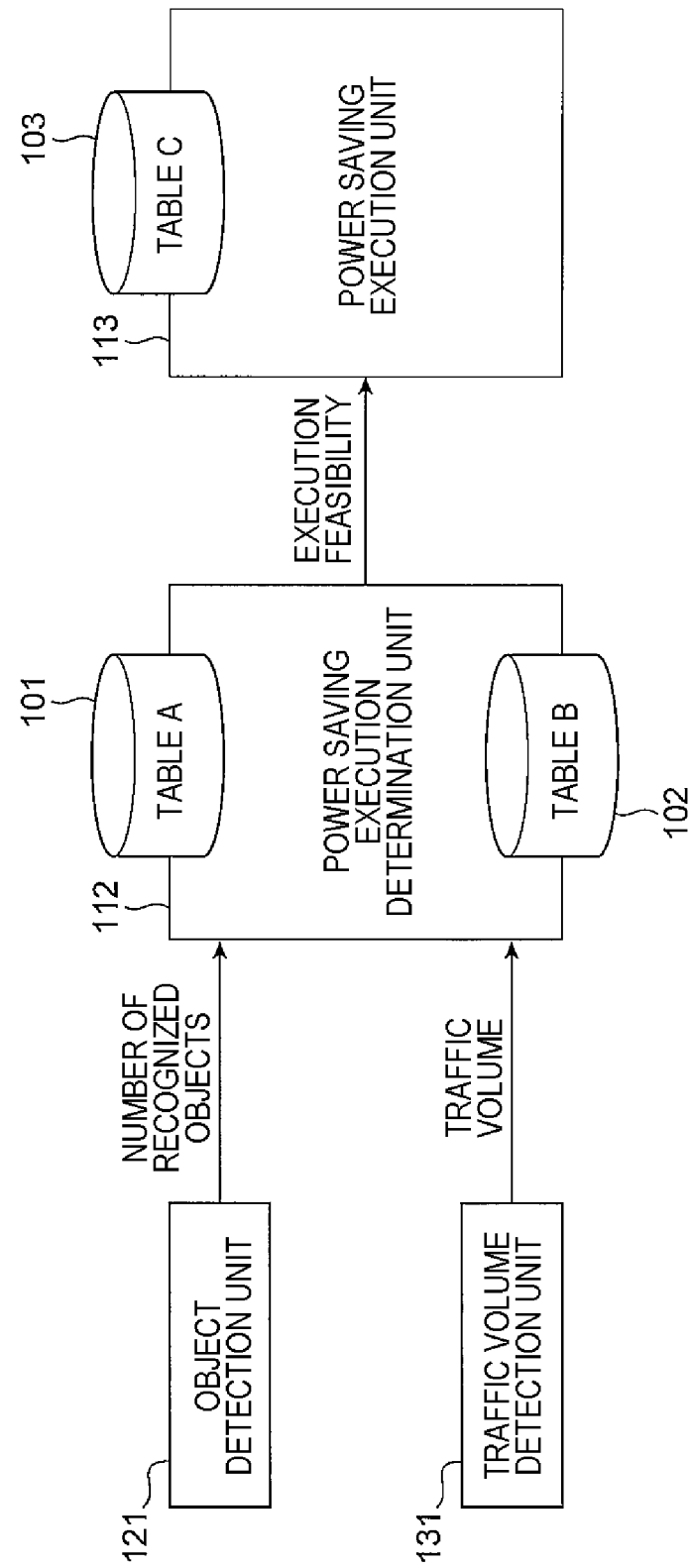
FIG. 2 is a processing flow of the system according to the first embodiment.

FIG. 2 illustrates a processing flow of the system according to the first embodiment. The vehicle control device 1 includes a plurality of detection units that detect an external situation around the own vehicle, the plurality of detection units detects the same type or different types of events by different algorithms, and the power saving execution determination unit 112 determines the shift to or the release from the power saving mode on the basis of detection results by the plurality of detection units. In the present embodiment, the power saving execution determination unit 112 uses the number of recognized objects, which is the output of the object detection unit 121, and the traffic volume, which is the output of the traffic volume detection unit 131, as inputs, and determines whether to execute power saving, using a relationship table A 101 and a relationship table B 102.

The power saving execution unit 113 executes power saving of the automatic driving ECU 11 on the basis of Table C 103 on the basis of implementation feasibility information that is a determination result.

FIG. 3 illustrates an example of the relationship table A between the number of recognized objects and the estimated CPU load according to the first embodiment. The relationship table A 101 includes information on the number of recognized objects, the estimated CPU load, and power saving feasibility.

According to the relationship table A 101, when the number of recognized objects is 3 or less, which is a threshold, the CPU load of the automatic driving ECU 11 becomes smaller as the power saving can be performed. On the other hand, when the number of recognized objects exceeds 3, the CPU load of the CPU 114 increases, and thus power saving cannot be executed. This threshold is a threshold in consideration of the release timing.

In the present embodiment, the normal mode can be shifted to the power saving mode when the number of recognized objects is 3 or less, but the present invention is not limited thereto. For example, the threshold may be 4 or any other number as long as the timing at which the time constraint of the control processing can be guaranteed when the power saving mode is released can be ensured by the threshold. In addition, in the present embodiment, the number of recognized objects and the traffic volume have been described as examples of events, but the present invention is not limited thereto. For example, the information may include any one or more of the number of recognized objects around the own vehicle, information on a traffic volume, danger risk information indicating a past accident history, a potential accident risk, or the like, an own vehicle speed, an other-vehicle speed, external environment complexity obtained from a spatial frequency of image data, and information on a movement amount of another vehicle.

FIG. 4 illustrates an example of the relationship table B between the traffic volume and the estimated CPU load according to the first embodiment. The relationship table B 102 includes information on the traffic volume, the estimated CPU load, and power saving feasibility.

According to this relationship table B, when the traffic volume is equal to or less than a predetermined value A, the CPU load of the automatic driving ECU 11 becomes smaller as the power saving can be performed. On the other hand, when the traffic volume exceeds the predetermined value A, the CPU load of the automatic driving ECU 11 increases, and thus power saving cannot be performed. The threshold is a threshold in consideration of the release timing, and the time constraint of the control processing can be guaranteed when the power saving mode is released by the threshold.

FIG. 5 illustrates an example of the relationship table C between the power saving determination and the CPU frequency according to the first embodiment. The relationship table C 103 includes information on power saving determination and a CPU frequency. According to this relationship table C, the CPU frequency of the CPU 114 is set to 0.8 GHz when power saving is possible, and the CPU frequency of the CPU 114 is set to 1.5 GHz when power saving is not possible.

Hereinafter, details of the operation flow according to the first embodiment will be described.

Figure 6:
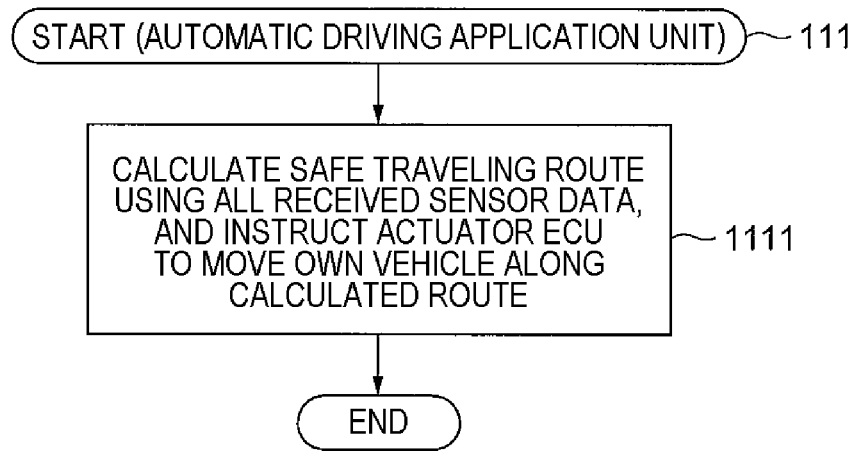
FIG. 6 is an operation flow of an automatic driving application unit.

FIG. 6 is an operation flow of the automatic driving application unit 111. Hereinafter, each step of FIG. 6 will be described.
(FIG. 6: Step 1111)

The automatic driving application unit 111 calculates a safe traveling route using all the received sensor data, and instructs the actuator ECU 14 to move the own vehicle according to the calculated route. The actuator ECU 14 drives an accelerator, a brake, and a steering of the vehicle based on an instruction from the automatic driving application unit 111.

Figure 7:
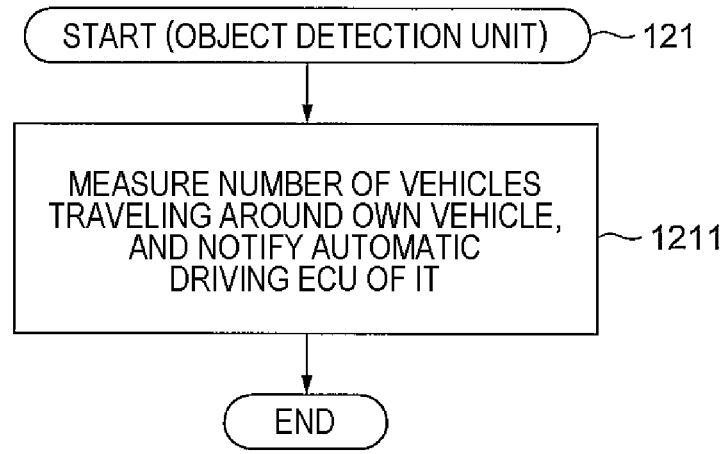
FIG. 7 is an operation flow of an object detection unit.

FIG. 7 is an operation flow of the object detection unit 121. Hereinafter, each step of FIG. 7 will be described.
(FIG. 7: Step 1211)

The object detection unit 121 measures the number of vehicles traveling around the own vehicle and notifies the automatic driving ECU 11 of the number of vehicles.

Figure 8:
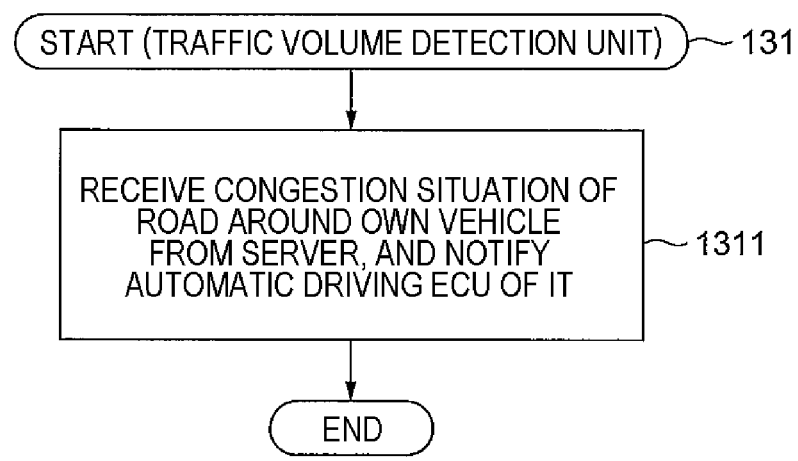
FIG. 8 is an operation flow of a traffic volume detection unit.

FIG. 8 is an operation flow of the traffic volume detection unit 131. Hereinafter, each step of FIG. 8 will be described.
(FIG. 8: Step 1311)

The traffic volume detection unit 131 receives the congestion situation of the road around the own vehicle from a server and notifies the automatic driving ECU 11 of the congestion situation.

Figure 9:
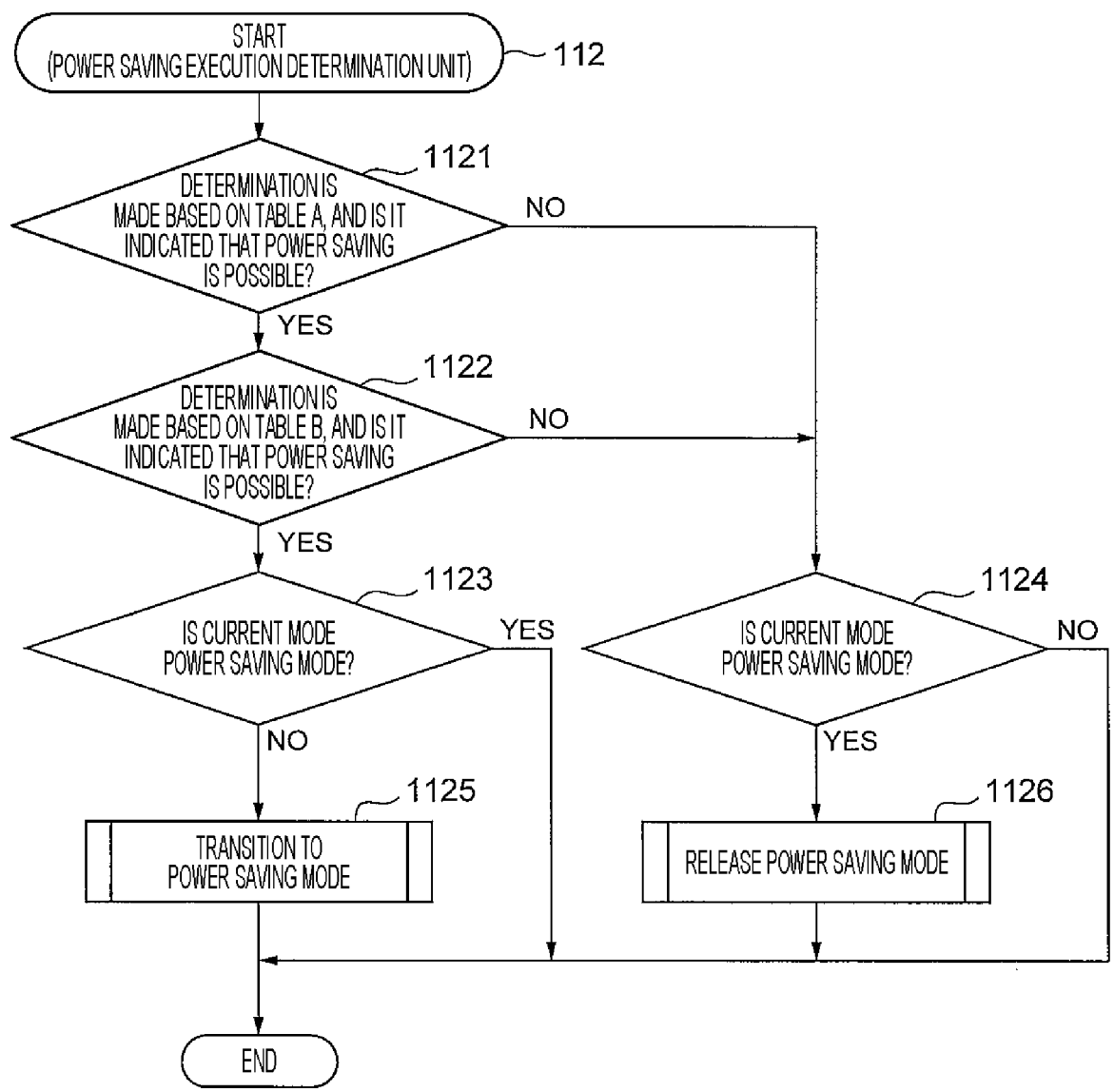
FIG. 9 is an operation flow of a power saving execution determination unit according to the first embodiment.

FIG. 9 is an operation flow of the power saving execution determination unit 112. Hereinafter, each step of FIG. 9 will be described.
(FIG. 9: Step 1121)

The power saving execution determination unit 112 compares the received number of recognized objects with the threshold of the number of recognized objects in the relationship table A 101, and determines whether power saving is possible. If true, the process proceeds Step 1122, and if false, the process proceeds to Step 1124.
(FIG. 9: Step 1122)

The power saving execution determination unit 112 compares the received traffic volume information with the threshold in the traffic volume in Table B 102, and determines whether power saving is possible. If true, the process proceeds to Step 1123, and if false, the process proceeds to Step 1124.
(FIG. 9: Step 1123)

The power saving execution determination unit 112 determines whether the current mode is the power saving mode. If false, the process proceeds to step 1125, and if true, the operation flow ends.
(FIG. 9: Step 1124)

The power saving execution determination unit 112 determines whether the current mode is the power saving mode. If true, the process proceeds to Step 1126, and if false, the operation flow ends.

If false in Step 1123 or true in Step 1124, the power saving execution determination unit 112 calls the power saving execution unit 113 based on the relationship table C 103.
(FIG. 9: Step 1125)

The power saving execution determination unit 112 instructs the power saving execution unit 113 to transition from the normal mode to the power saving mode.
(FIG. 9: Step 1126)

The power saving execution determination unit 112 instructs the power saving execution unit 113 to release the power saving mode.

Figure 10:
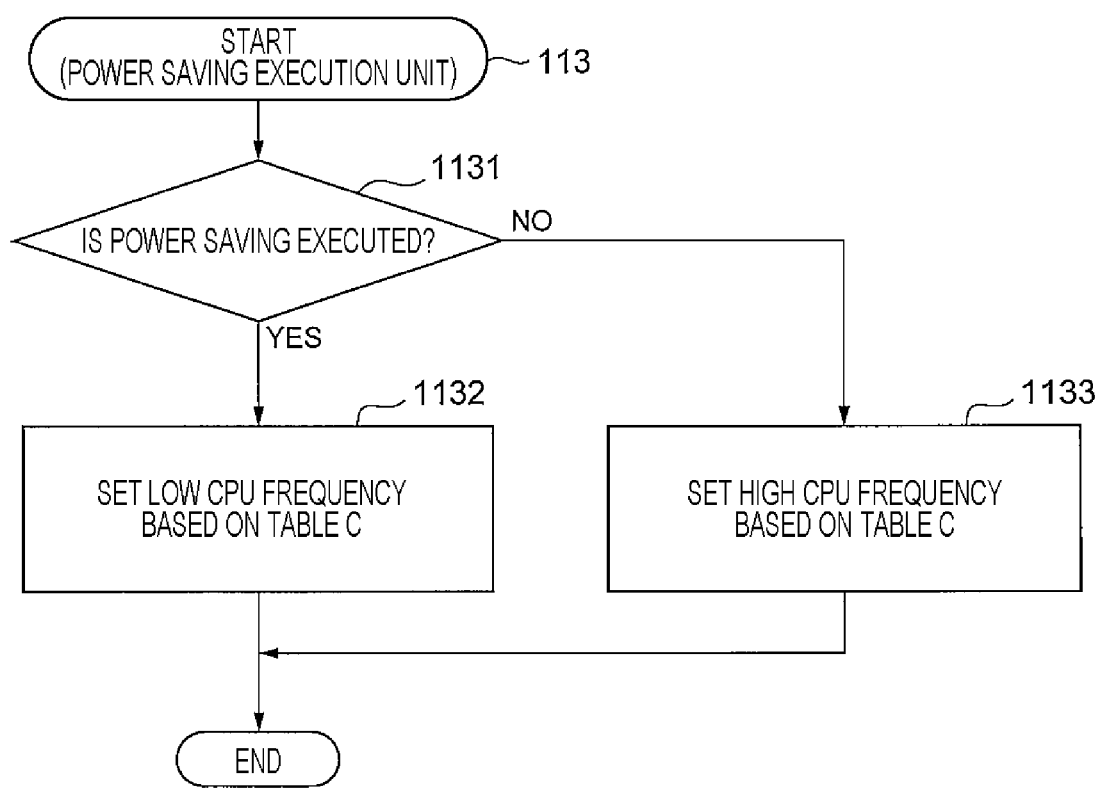
FIG. 10 is an operation flow of a power saving execution unit according to the first embodiment.

FIG. 10 is an operation flow of the power saving execution unit 113. Hereinafter, each step of FIG. 10 will be described.
(FIG. 10: Step 1131)

The power saving execution unit 113 determines whether the instructed input information is an instruction for transition from the normal mode to the power saving mode. If true, the process proceeds to Step 1132, and if false, the process proceeds to Step 1133.

(FIG. 10: Step 1132)

The power saving execution unit 113 sets a relatively low CPU frequency as the frequency of the CPU 114 based on the relationship table C 103.

(FIG. 10: Step 1133)

The power saving execution unit 113 sets a relatively high CPU frequency as the frequency of the CPU 114 based on the relationship table C 103.

Figure 11:
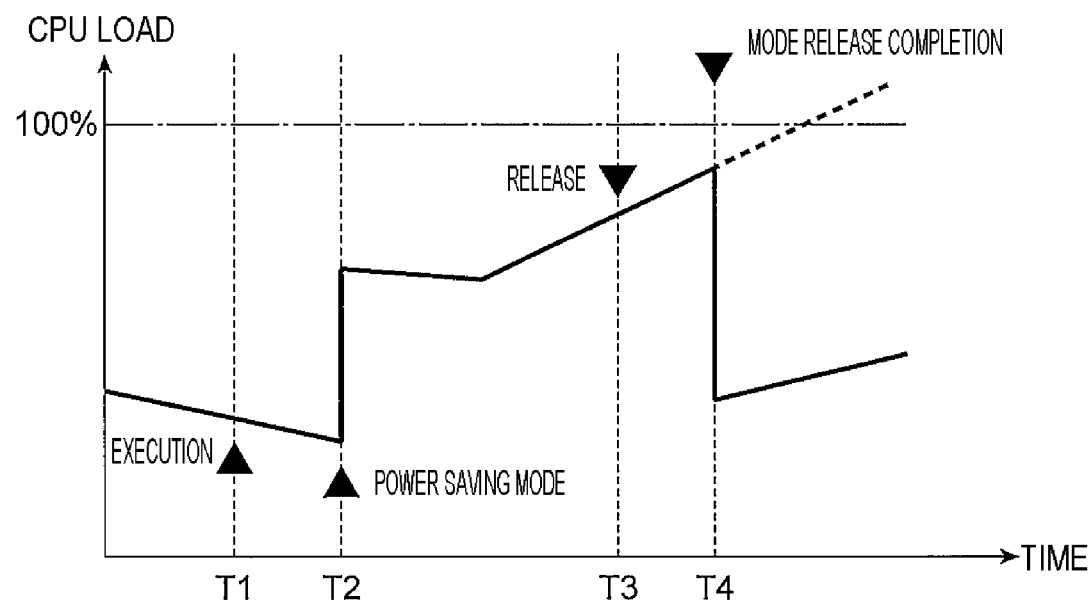
FIG. 11 is an example of transition of a CPU load according to the first embodiment.

FIG. 11 illustrates an example of transition of the CPU load according to the first embodiment. At timing T1, the conditions defined in both the relationship table A 101 and the relationship table B 102 are the power saving: possible, and thus the shift to the power saving mode is started. Then, the transition to the power saving mode is completed at timing T2. At timing T3, both or one of the conditions of the relationship table A 101 and the relationship table B 102 is the power saving: impossible, and thus the release of the power saving mode is instructed. Then, the release of the power saving mode is completed at timing T4.

The timing at which the power saving execution determination unit 112 instructs the power saving execution unit 113 to release the power saving mode is a timing at which the return from the power saving mode to the normal mode in the power saving execution unit 113 can be completed before the processing load of the CPU 114 exceeds a preset upper limit threshold. Specifically, timing T1 to start the shift to the power saving mode or timing T3 to instruct to release the power saving mode are a timing at which the control processing ends within the deadline, that is, a timing at which the control processing ends before the CPU load exceeds a preset upper limit threshold (for example, 100% CPU load) even during or after the instruction, and the power saving execution determination unit 112 performs determination and an instruction on the basis of the timing.

The shift threshold and the release threshold of the power saving execution determination unit 112 to the power saving mode are set to values at which the execution load of the CPU 114 is less than 100% while the control processing satisfies the deadline or in a certain period of time, and the power saving execution determination unit 112 issues an instruction to release the power saving mode to the power saving execution unit 113 when the release threshold is exceeded.

In the present embodiment, in order to prevent missing of the release timing, whether the power saving is possible is determined by two types of methods, so that the release of the power saving mode can be realized at timing T4. On the other hand, in a case where the determination is made only on one condition, if the release timing is missed, timing T4 is exceeded, the CPU load exceeds an upper limit threshold (for example, 100%) which is a deadline, and there is a possibility that the time constraint of the control processing cannot be satisfied. In the present embodiment, it is assumed that the CPU load is less than 100%, that is, does not exceed the upper limit threshold of 100% from the viewpoint of preventing the deadline excess so that the required calculation performance does not exceed the allowable operation amount of the CPU 114, but the present invention is not limited thereto. For example, in the case of a system designed so that the CPU load does not exceed 80% as an upper limit threshold in consideration of a design margin, a setting value or a threshold is provided in the relationship table A 101 and the relationship table B 102 so as not to exceed 80% at all times, and the power saving implementation determination is performed.

Figure 12:
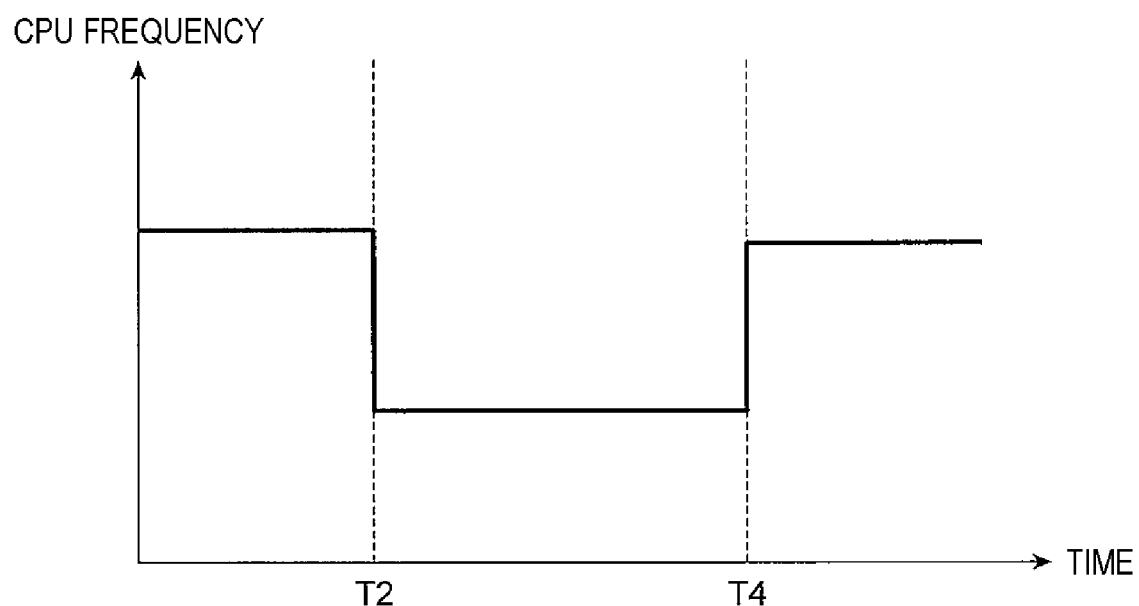
FIG. 12 is an example of transition of a CPU frequency according to the first embodiment.

FIG. 12 illustrates an example of transition of the CPU frequency according to the first embodiment. Since the shift to the power saving mode is completed at timing T2, the CPU frequency of the CPU 114 decreases. Since the release of the power saving mode is completed at timing T4, the CPU frequency of the CPU 114 returns to the original frequency.

Figure 13:
FIG. 13 is an example of transition of power consumption according to the first embodiment.

FIG. 13 illustrates an example of transition of power consumption according to the first embodiment. Since the shift to the power saving mode is completed at timing T2, the power consumption decreases. Since the release of the power saving mode is completed at timing T4, the power consumption increases.

According to the first embodiment, since the CPU load becomes lower as the number of objects to be recognized is smaller, whether a current situation where the number of objects to be recognized around the own vehicle is smaller is estimated by two means of the number of recognized objects and the traffic volume. As a result, the shift timing and the release timing to and from the power saving mode can be determined with high reliability, and both the safety of the control processing and the power saving can be achieved. In the present embodiment, the above-described situation is estimated based on the number of recognized objects of the camera ECU and the traffic volume information of the car navigation ECU, but the present invention is not limited thereto. For example, a combination of the number of recognized objects of the camera ECU and the number of recognized objects of the ECU equipped with a Lidar may be used, or a combination of the image complexity of the camera ECU and the number of recognized objects of the ECU equipped with a Lidar may be used. For example, the congestion situation may be estimated by defining the change amount of the luminance value calculated from the camera image as the external environment complexity and monitoring the change amount in time series. In addition, the present invention is not limited to these two types, and may be three or more types.

According to the first embodiment, the power saving mode is shifted when the number of objects to be recognized is small, but the present invention is not limited thereto. For example, in the case of an intersection with poor visibility, the number of objects to be recognized is small, but it is necessary to immediately cope with a flying object from a blind spot. At this time, the power saving execution determination is made for two types of the number of recognized objects and the dangerous risk information, so that it is possible to prevent the mode from shifting to the power saving mode at an intersection where visibility is poor. In addition, the present invention is not limited to these two types.

According to the first embodiment, the power saving execution determination is performed from two types of information, but the present invention is not limited thereto. For example, two or more types may be used. For example, in the case of three or more types, even if one type of detection result indicates that power saving cannot be executed, the mode may transition to the power saving mode when half or more of the detection results indicate that power saving can be performed. Each detection result may be weighted to affect the result of the power saving execution determination. For example, by increasing the weight on the presence or absence of a sensor fault, the power saving execution determination unit does not permit the shift to the power saving mode even if another detection result indicates that power saving can be executed. Accordingly, safety can be guaranteed.

According to the first embodiment, traffic volume information is acquired by communicating with a server, but the present invention is not limited thereto. For example, the number of recognized objects at an intersection may be received from an infrastructure such as a signal. In addition, the present invention is not limited thereto.

According to the first embodiment, since the CPU frequency is reduced in the power saving mode, the power consumption can be reduced as compared with the non-power saving mode.

Second Embodiment

The second embodiment is an example of a case where the algorithm of a power saving execution unit 213 is different. A characteristic feature of the present embodiment is that an automatic driving ECU 21 includes, as CPUs, a high-performance CPU 214 and an energy-saving CPU 215 that consumes less power than the high-performance CPU 214, and the power saving execution unit 213 is configured to execute an automatic driving application by the high-performance CPU 214 in the normal mode and execute an automatic driving application by the energy-saving CPU 215 in the power saving mode. In the present embodiment, the same components as those of the first embodiment are denoted by the same reference numerals, and a detailed description thereof will be omitted.

Figure 14:
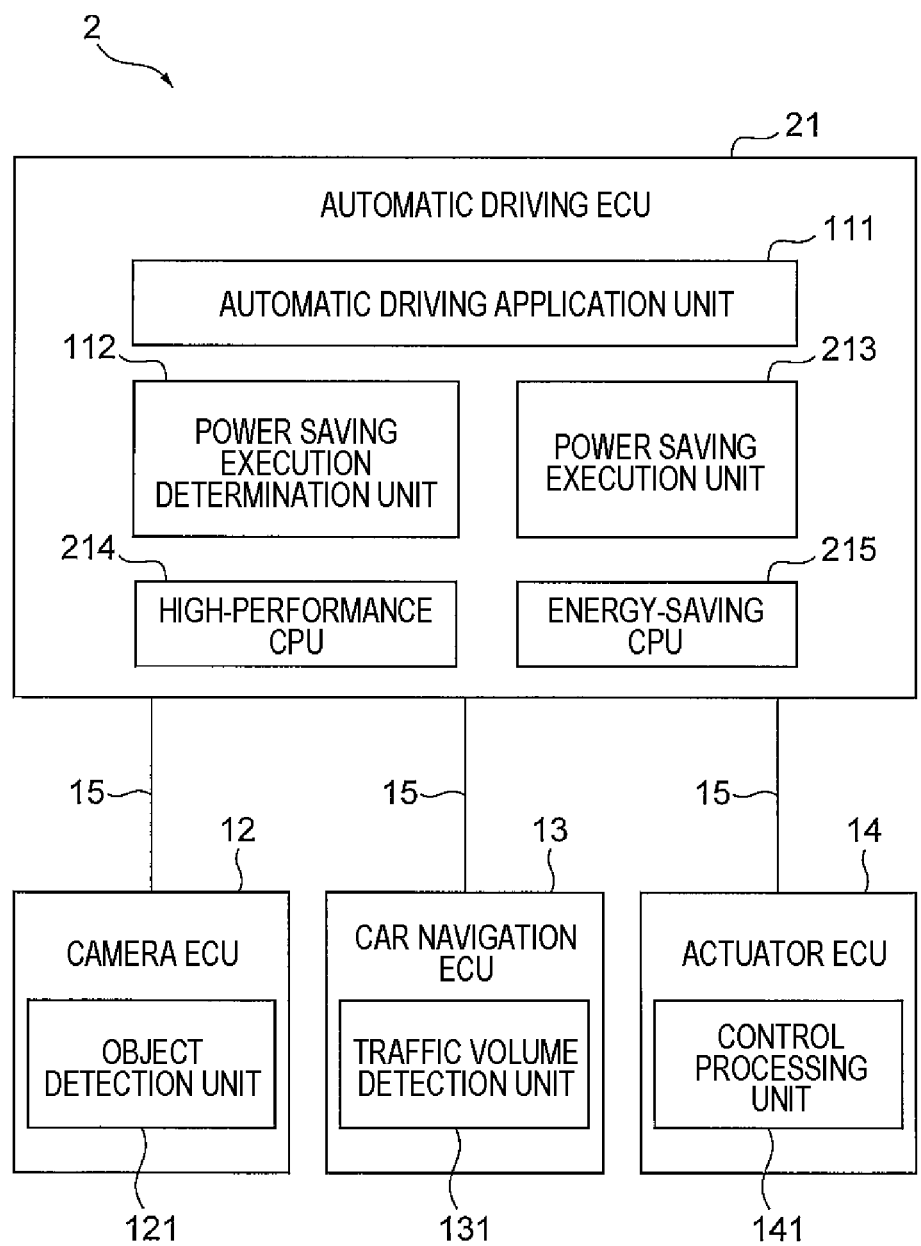
FIG. 14 is a configuration diagram of a system and a vehicle control device according to a second embodiment.

FIG. 14 is a configuration diagram of a system and a vehicle control device 2 according to the second embodiment. As compared with the first embodiment, the automatic driving ECU 21 includes the power saving execution unit 213 of a different algorithm, and the high-performance CPU 214 and the energy-saving CPU 215 which are different CPUs. The high-performance CPU 214 has a higher processing speed than that of the energy-saving CPU 215, but also has higher power consumption than that of the energy-saving CPU 215. On the other hand, the energy-saving CPU 215 has a slower processing speed than that of the high-performance CPU, but has lower power consumption than that of the high-performance CPU, and hence the power saving can be achieved.

Figure 15:
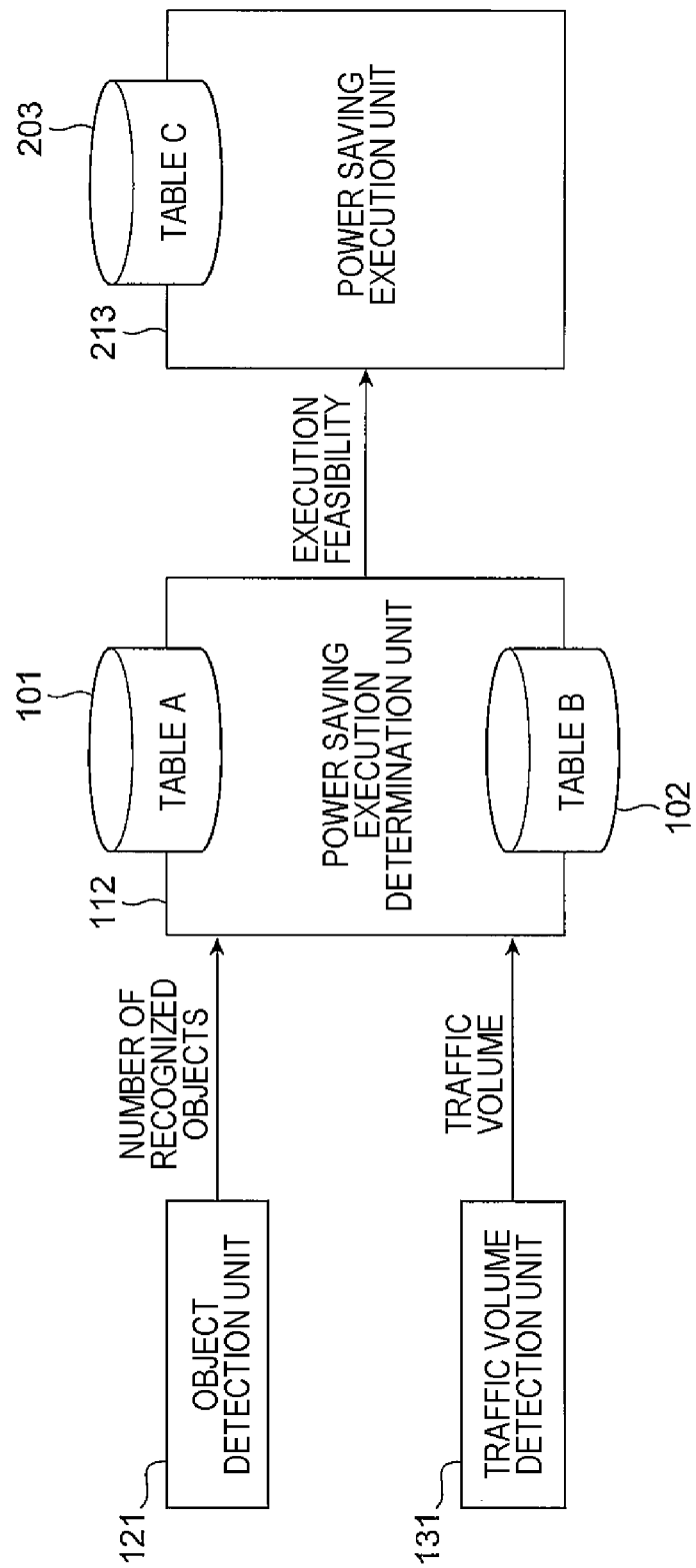
FIG. 15 is a processing flow of a system according to the second embodiment.

FIG. 15 illustrates a processing flow of the system according to the second embodiment.

Although the input information of the power saving execution unit 213 is similar to that of the first embodiment, the power saving is executed using the relationship table C 203 because the algorithm to be used is different.

FIG. 16 illustrates an example of the relationship table C 203 between the power saving determination and the CPU executing the automatic driving application according to the second embodiment. This table includes information on the power saving determination and the CPU executing the automatic driving application. According to this table, the automatic driving application is executed by the energy-saving CPU 215 when the power saving can be performed, and the automatic driving application is executed by the high-performance CPU when the power saving is not possible.

Hereinafter, details of the operation flow according to the second embodiment will be described.

Figure 17:
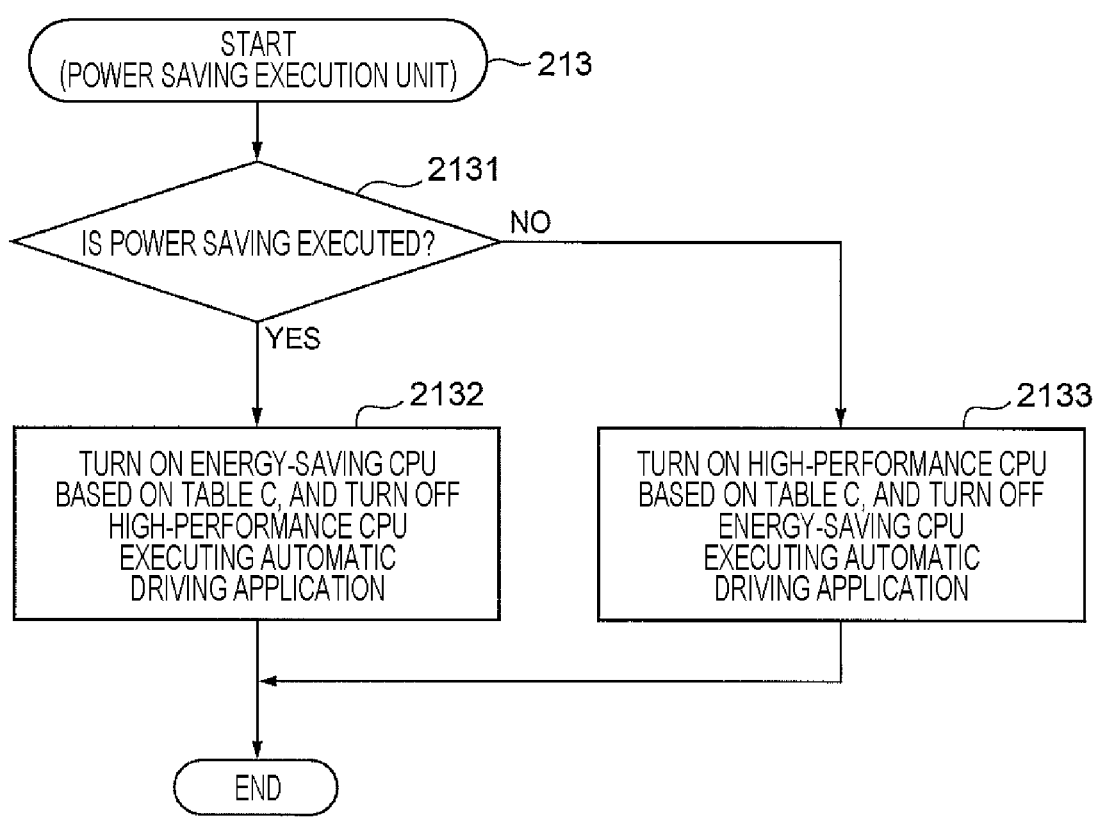
FIG. 17 is an operation flow of a power saving execution unit according to the second embodiment.

FIG. 17 is an operation flow of the power saving execution unit 213. Hereinafter, each step of FIG. 17 will be described.

(FIG. 17: Step 2131)

The power saving execution unit 213 determines whether the instructed input information is an instruction for transition to the power saving mode. If true, the process proceeds to Step 2132, and if false, the process proceeds to Step 2133.

(FIG. 17: Step 2132)

The power saving execution unit 213 sets the energy-saving CPU 215 to ON based on the relationship table C 203 in FIG. 16, and changes the CPU that executes the automatic driving application from the high-performance CPU 214 to the energy-saving CPU 215. Then, the high-performance CPU 214 is set to OFF.

(FIG. 17: Step 2133)

The power saving execution unit 213 sets the high-performance CPU 214 ON based on the relationship table C 203 in FIG. 16, and changes the CPU that executes the automatic driving application from the energy-saving CPU 215 to the high-performance CPU 214. Then, the energy-saving CPU 215 is set to OFF.

Figure 18:
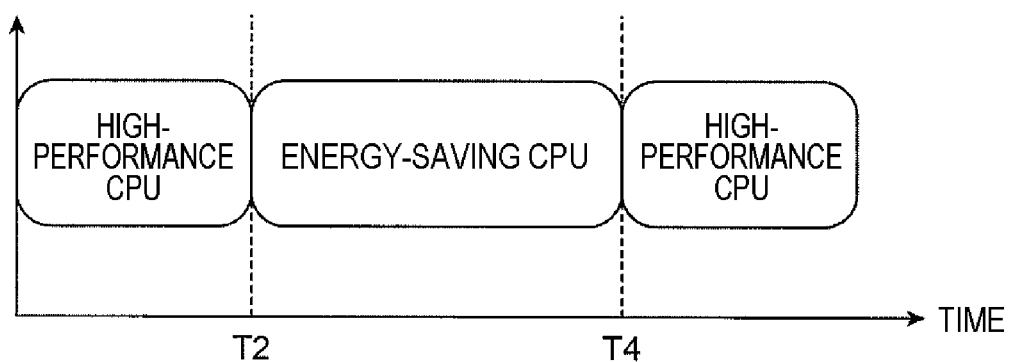
FIG. 18 is an example of transition of a CPU executing an automatic driving application according to the second embodiment.

FIG. 18 illustrates an example of a transition of the CPU that executes the automatic driving application according to the second embodiment. Since the transition to the power saving mode is completed at timing T2, the CPU on which the automatic driving application is executed is changed from the high-performance CPU 214 to the energy-saving CPU 215. Since the release of the power saving mode is completed at timing T4, the CPU on which the automatic driving application is executed is changed from the energy-saving CPU 215 to the high-performance CPU 214.

According to the second embodiment, since the automatic driving application is executed by the energy-saving CPU in the power saving mode, the power consumption can be reduced as compared with the non-power saving mode. According to the second embodiment, it is possible to appropriately determine the timing of releasing the power saving of the CPU and complete the release of the power saving mode of the CPU so that the control processing by the CPU satisfies the time constraint. Therefore, it is possible to perform the control processing such that the CPU satisfies the time constraint while using the power saving means of the CPU, and it is possible to achieve both safety and power saving of the automatic driving system.

In the second embodiment, the case where either one of the high-performance CPU 214 and the energy-saving CPU 215 is selected by switching according to the situation of the external environment has been described as an example, but the present invention is not limited thereto. For example, a plurality of CPUs (both the high-performance CPU 214 and the energy-saving CPU 215) may be used in the normal mode, and some CPUs (only the energy-saving CPU 215) of the plurality of CPUs may be used in the energy-saving mode.

Third Embodiment

The third embodiment is an example of a case where there are two types of application units: a function-limited automatic driving application unit 317 configured with a minimum function necessary at the time of traffic congestion; and a fully-functioned automatic driving application unit 311 used at the time of normal traveling. A characteristic feature of the present embodiment is that a power saving execution unit 313 switches, as the power saving control of the CPU 114, the automatic driving application executed by the CPU to the automatic driving application having a function more limited than that of the normal mode together with the instruction to decrease the frequency of the CPU 114. In the present embodiment, the same components as those of the embodiments described above are denoted by the same reference numerals, and a detailed description thereof will be omitted.

Figure 19:
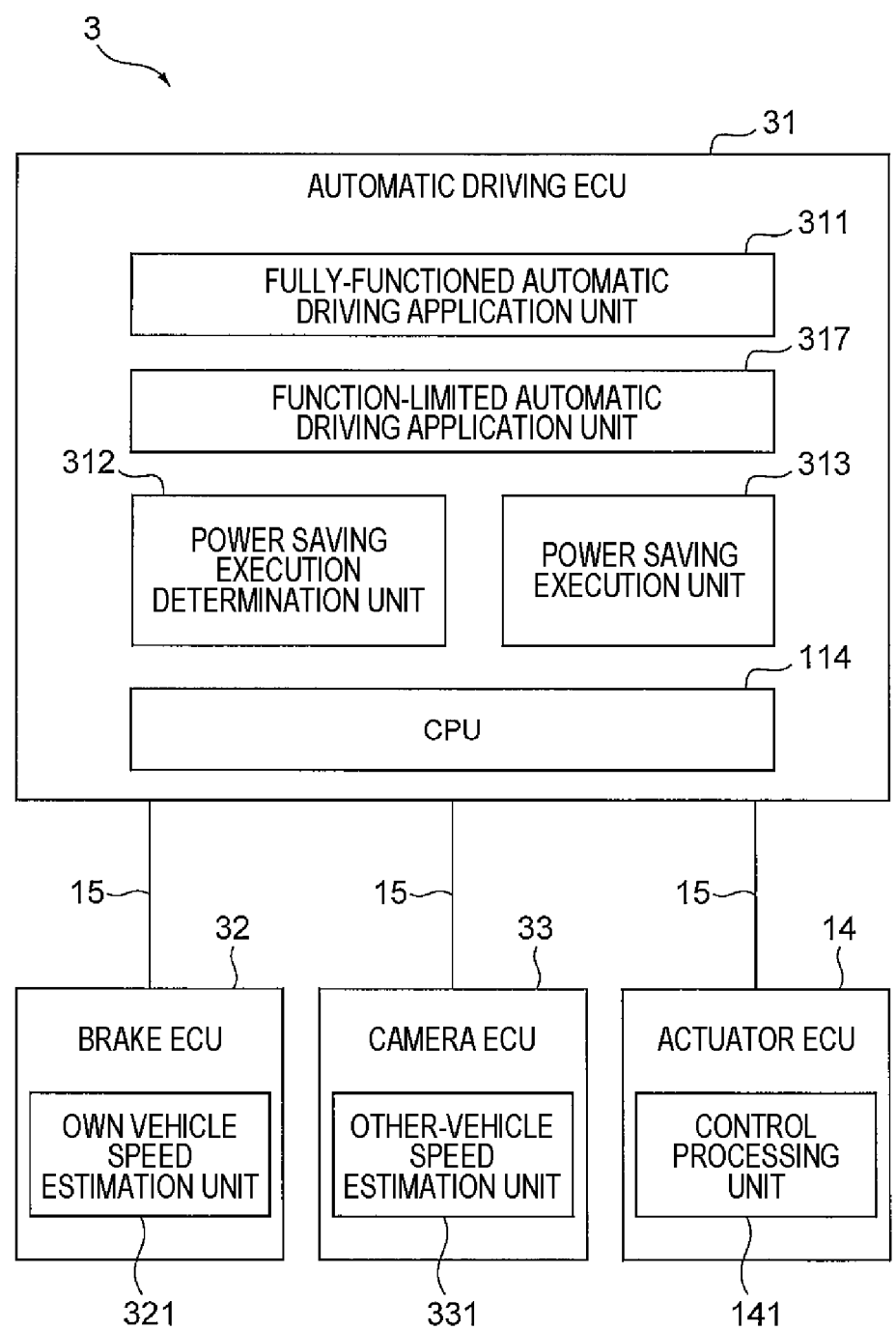
FIG. 19 is a configuration diagram of a system and a vehicle control device according to a third embodiment.

FIG. 19 is a configuration diagram of a system and a vehicle control device according to the third embodiment.

An automatic driving ECU 31 is different from the above-described embodiments in terms of the fully-functioned automatic driving application unit 311, the function-limited automatic driving application unit 317, a power saving execution determination unit 312, the power saving execution unit 313, an own vehicle speed estimation unit 321, and an other-vehicle speed estimation unit 331.

Figure 20:
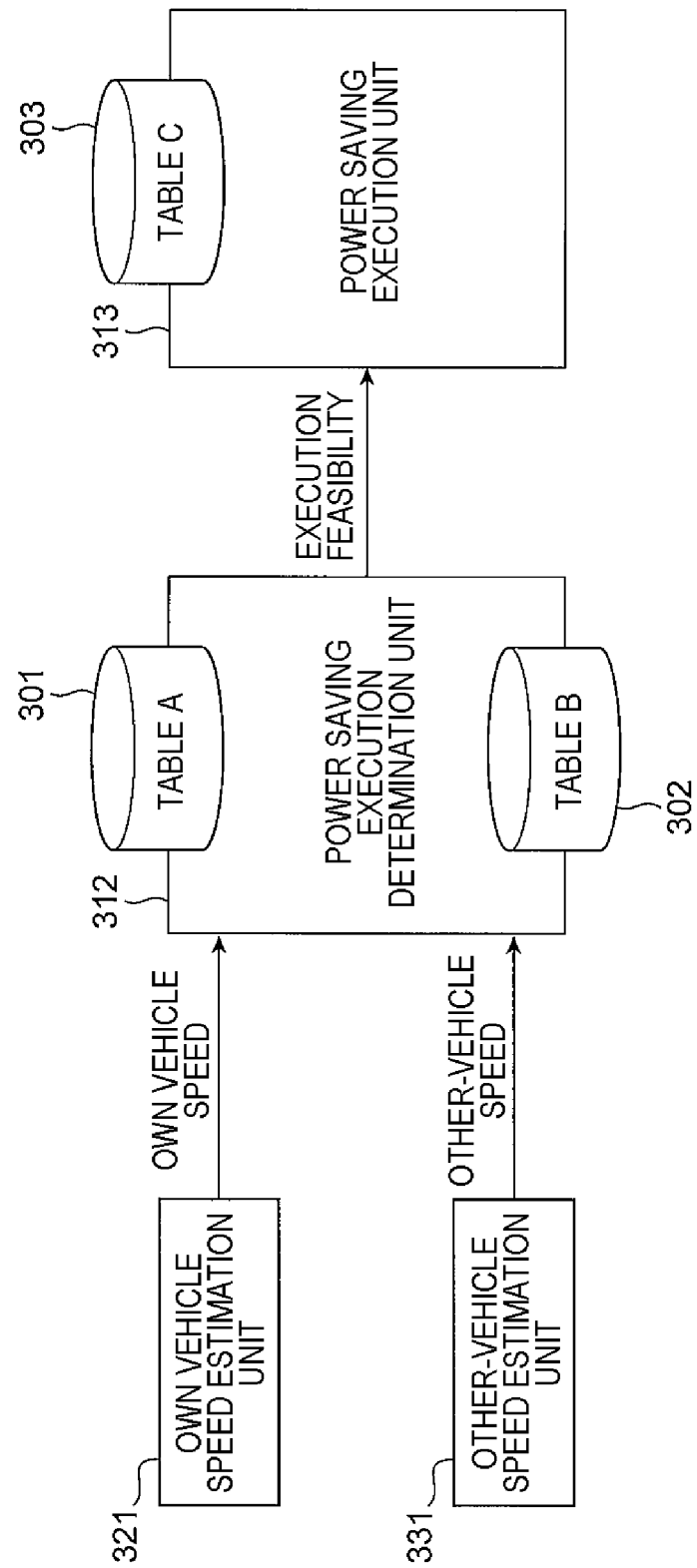
FIG. 20 is a processing flow of a system according to the third embodiment.

FIG. 20 illustrates a processing flow of the system according to the third embodiment. The power saving execution determination unit 312 uses an own vehicle speed which is an output of the own vehicle speed estimation unit 321 and an other-vehicle speed which is an output of the other-vehicle speed estimation unit 331, as inputs, and determines whether to execute power saving, using a relationship table A 301 and a relationship table B 302. The power saving execution unit 313 executes the power saving control on the basis of the relationship table C 303 on the basis of the execution feasibility information that is the determination result.

FIG. 21 illustrates an example of the relationship table A 301 between the own vehicle speed and the grace time until collision according to the third embodiment. This table includes information on the own vehicle speed, the grace time until collision, and the power saving feasibility. This table indicates that power saving can be executed when the own vehicle speed is 5 km/h or less. On the other hand, when the speed exceeds 5 km/h, the power saving cannot be performed. This threshold is a threshold in consideration of the release timing.

In the present embodiment, the shift to the power saving mode is possible when the own vehicle speed is 5 km/h or less, but the present invention is not limited thereto. For example, the threshold may be 10 km/h or any other number as long as the timing at which the control processing by the CPU can satisfy the time constraint when the power saving mode is released can be ensured by the threshold.

FIG. 22 illustrates an example of the relationship table B between the other-vehicle speed and the situation change according to the third embodiment. The relationship table B 302 includes information on an other-vehicle speed, a situation change, and power saving feasibility. The situation change indicates whether the other vehicle is maintained at 5 km/h or less for a certain period of time, and indicates no change when the other vehicle is maintained at 5 km/h or less, and indicates a change when the other vehicle is not maintained at 5 km/h. The relationship table B 302 indicates that power saving can be executed when the other-vehicle speed is maintained at 5 km/h or less for a certain period of time. On the other hand, when the other-vehicle speed exceeds 5 km/h and is not maintained at 5 km/h for a certain period of time, the power saving cannot be performed. This threshold is a threshold in consideration of the release timing. In the present embodiment, it is assumed that the other-vehicle speed is a speed relative to the own vehicle, but the present invention is not limited thereto. The absolute speed may be an absolute speed of the other vehicle alone.

FIG. 23 illustrates an example of the relationship table C between the power saving determination result, the execution function, and the CPU frequency according to the third embodiment. The relationship table C 303 includes information on a power saving determination result, an execution function, and a CPU frequency. According to this relationship table C 303, when power saving is possible, the CPU frequency of the CPU 114 is set to 0.8 GHz while the execution function is set to the function-limited automatic driving application unit 317. As a result, power consumption is reduced, and power saving can be achieved. In addition, since the automatic driving application with limited functions is executed, it is possible to prevent the control processing by the CPU 414 from exceeding the time constraint even if the CPU frequency is low. On the other hand, in a case where the power saving is not possible, it is indicated that the CPU frequency of the CPU 114 is set to 1.5 GHz while the execution function is set to the fully-functioned automatic driving application unit 311.

Hereinafter, details of the operation flow according to the third embodiment will be described.

Figure 24:
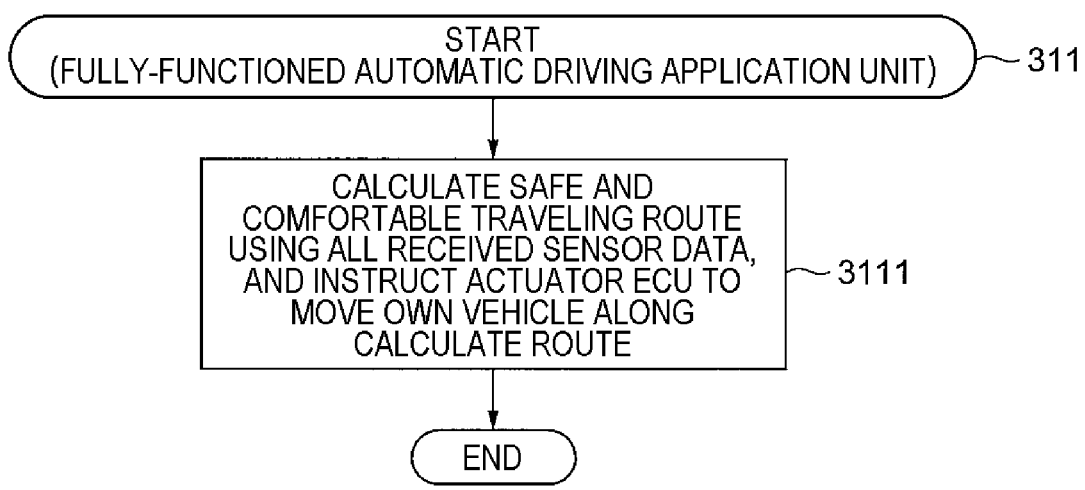
FIG. 24 is an operation flow of a fully-functioned automatic driving application unit.

FIG. 24 is an operation flow of the fully-functioned automatic driving application unit 311. Hereinafter, each step of FIG. 24 will be described.

(FIG. 24: Step 3111)

The fully-functioned automatic driving application unit 311 calculates a safe and comfortable traveling route using all the received sensor data, and instructs the actuator ECU 14 to move the own vehicle according to the calculated route.

Figure 25:
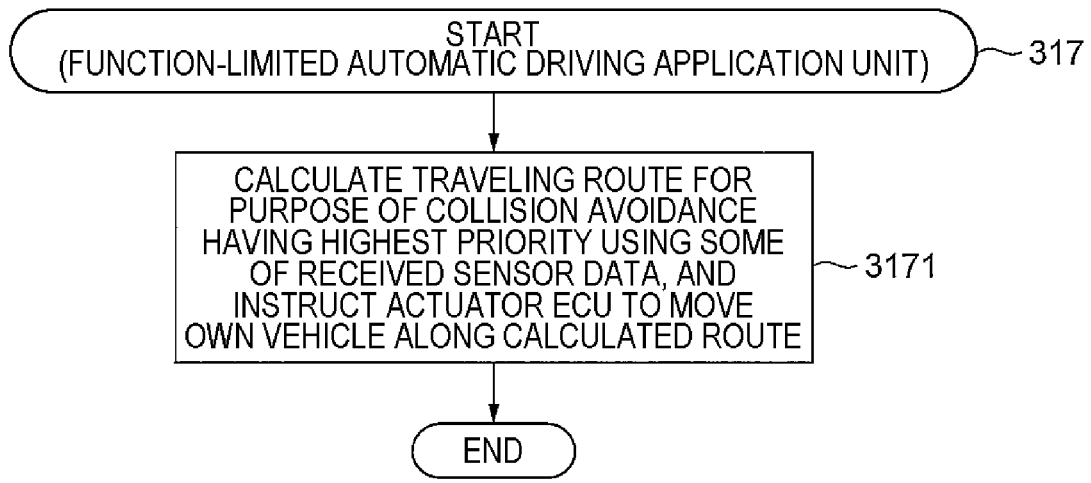
FIG. 25 is an operation flow of a function-limited automatic driving application unit.

FIG. 25 is an operation flow of the function-limited automatic driving application unit 317. Hereinafter, each step of FIG. 25 will be described.

(FIG. 25: Step 3171)

The function-limited automatic driving application unit 317 calculates a traveling route for the purpose of collision avoidance having the highest priority using some of the received sensor data, and instructs the actuator ECU 14 to move the own vehicle according to the calculated route.

Figure 26:
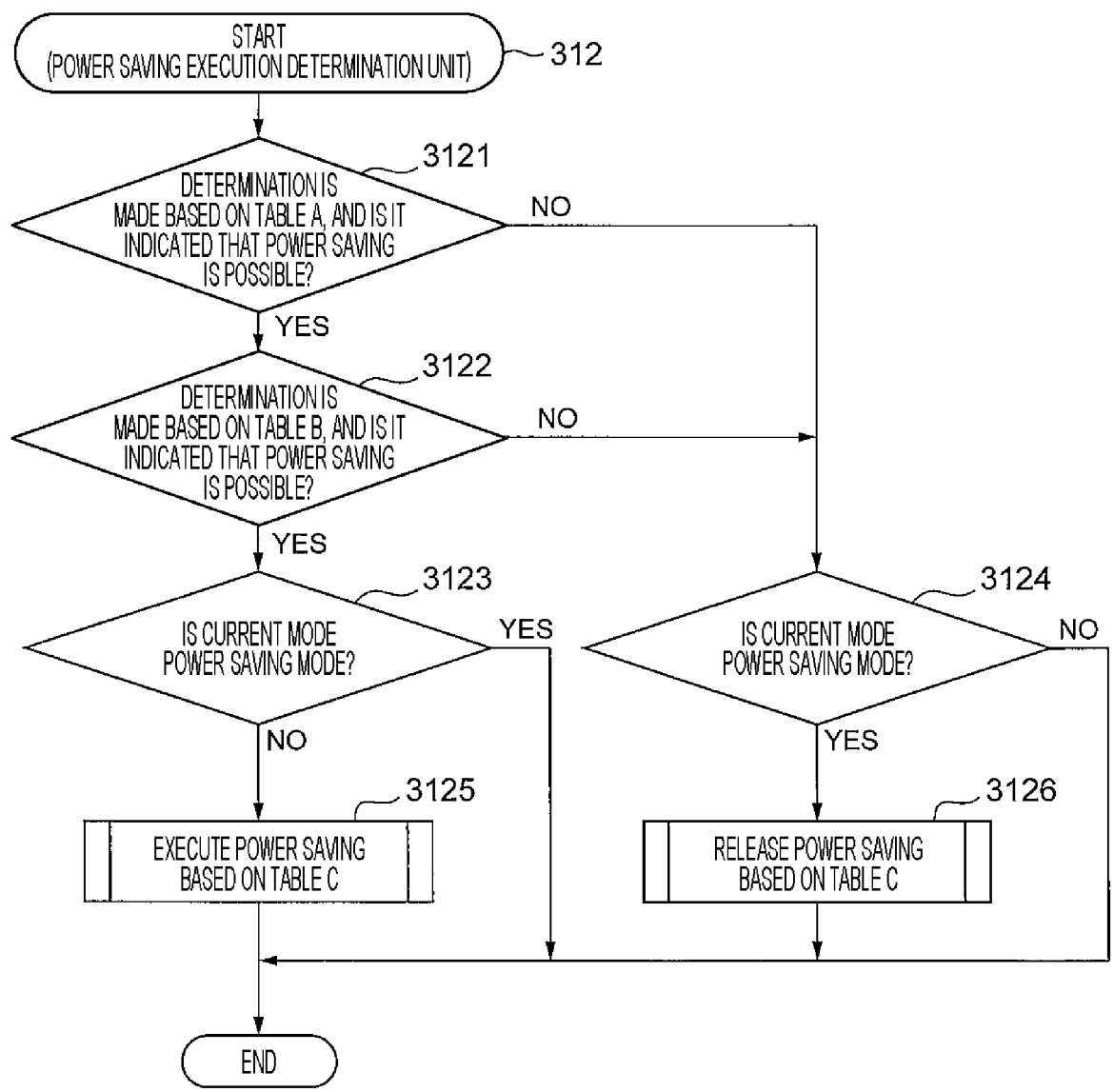
FIG. 26 is an operation flow of a power saving execution determination unit according to the third embodiment.

FIG. 26 is an operation flow of the power saving execution determination unit 312. Hereinafter, each step of FIG. 26 will be described.

(FIG. 26: Step 3121)

The power saving execution determination unit 312 compares the received information on the own vehicle speed with the threshold of the vehicle speed in the relationship table A 301, and determines whether power saving is possible. If true, the process proceeds to Step 3122, and if false, the process proceeds to Step 3124.

(FIG. 26: Step 3122)

The power saving execution determination unit 312 compares the received information on the other-vehicle speeds with the threshold of the other-vehicle speed in the relationship table B 302, and determines whether power saving is possible. If true, the process proceeds to Step 3123, and if false, the process proceeds to Step 3124.

(FIG. 26: Step 3123)

The power saving execution determination unit 312 determines whether the current mode is the power saving mode. If false, the process proceeds to step 3125, and if true, the operation flow ends.

(FIG. 26: Step 3124)

The power saving execution determination unit 312 determines whether the current mode is the power saving mode. If true, the process proceeds to Step 3126, and if false, the operation flow ends.

(FIG. 26: Step 3125)

The power saving execution determination unit 312 instructs the power saving execution unit 313 to transition to the power saving mode.

(FIG. 26: Step 3126)

The power saving execution determination unit 312 instructs the power saving execution unit 313 to release the power saving mode.

After completion of the operation flow of FIG. 26, the power saving execution determination unit 312 calls the power saving execution unit 313 based on the relationship table C 303.

Figure 27:
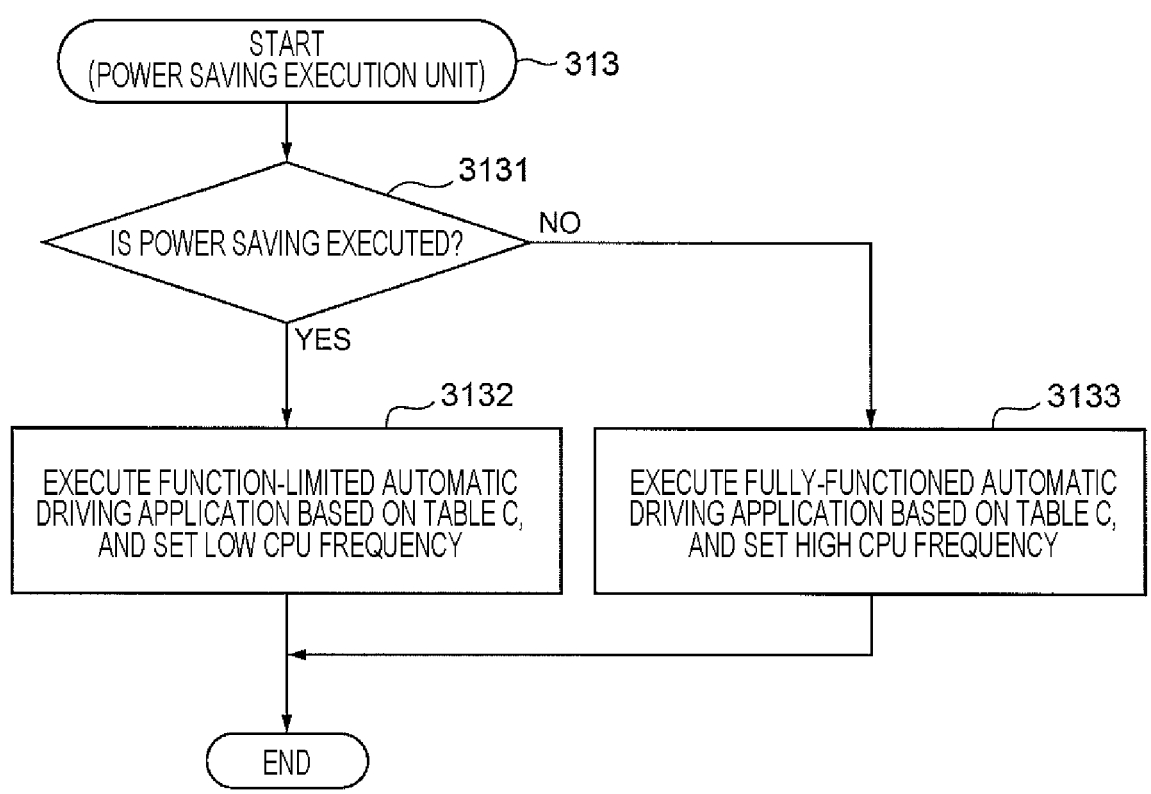
FIG. 27 is an operation flow of a power saving execution unit according to the third embodiment.

FIG. 27 is an operation flow of the power saving execution unit 313. Hereinafter, each step of FIG. 27 will be described.

(FIG. 27: Step 3131)

The power saving execution unit 313 determines whether the instructed input information is an instruction for transition to the power saving mode. If true, the process proceeds to Step 3132, and if false, the process proceeds to Step 3133.

(FIG. 27: Step 3132)

The power saving execution unit 313 executes the function-limited automatic driving application unit 317 based on the relationship table C 303 and sets a low CPU frequency.

(FIG. 27: Step 3133)

The power saving execution unit 313 executes the fully-functioned automatic driving application unit 311 based on the relationship table C 303 and sets a high CPU frequency.

Figure 28:
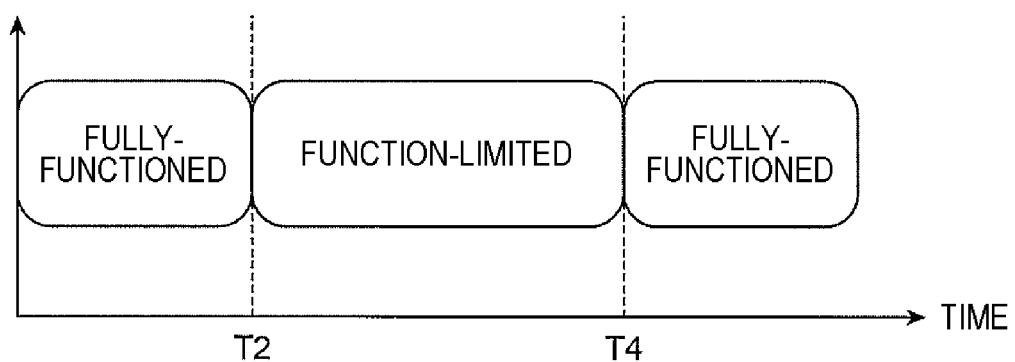
FIG. 28 is an example of transition of types of the automatic driving applications according to the third embodiment.

FIG. 28 illustrates an example of transition of types of automatic driving applications according to the third embodiment. Since the shift to the power saving mode is completed at timing T2, the running automatic driving application is changed from the fully-functioned automatic driving application unit 311 to the function-limited automatic driving application unit 317. Then, since the release of the power saving mode is completed at timing T4, the executing automatic driving application is returned from the function-limited automatic driving application unit 317 to the fully-functioned automatic driving application unit 311.

According to the third embodiment, since the speeds of the own vehicle and other vehicles decrease at the time of traffic congestion, there is no sudden change in the surroundings of the own vehicle. Therefore, in order to operate with the minimum necessary safety monitoring, the safety of the control processing can be guaranteed even if the CPU frequency is reduced by switching to the function-limited application in which the required calculation performance is reduced. Therefore, power consumption can be reduced in the power saving mode.

In the third embodiment, the congestion environment is estimated from the speeds of the own vehicle and the other vehicle, but the present invention is not limited thereto. For example, the movement amount of the surrounding object calculated from the point group information of Lidar may be estimated, and whether the current traffic jam situation is estimated from this information and the own vehicle speed. In addition, the present invention is not limited thereto.

Fourth Embodiment

The fourth embodiment is an example in which the algorithm of a power saving execution unit 413 is changed from that of the third embodiment.

Figure 29:
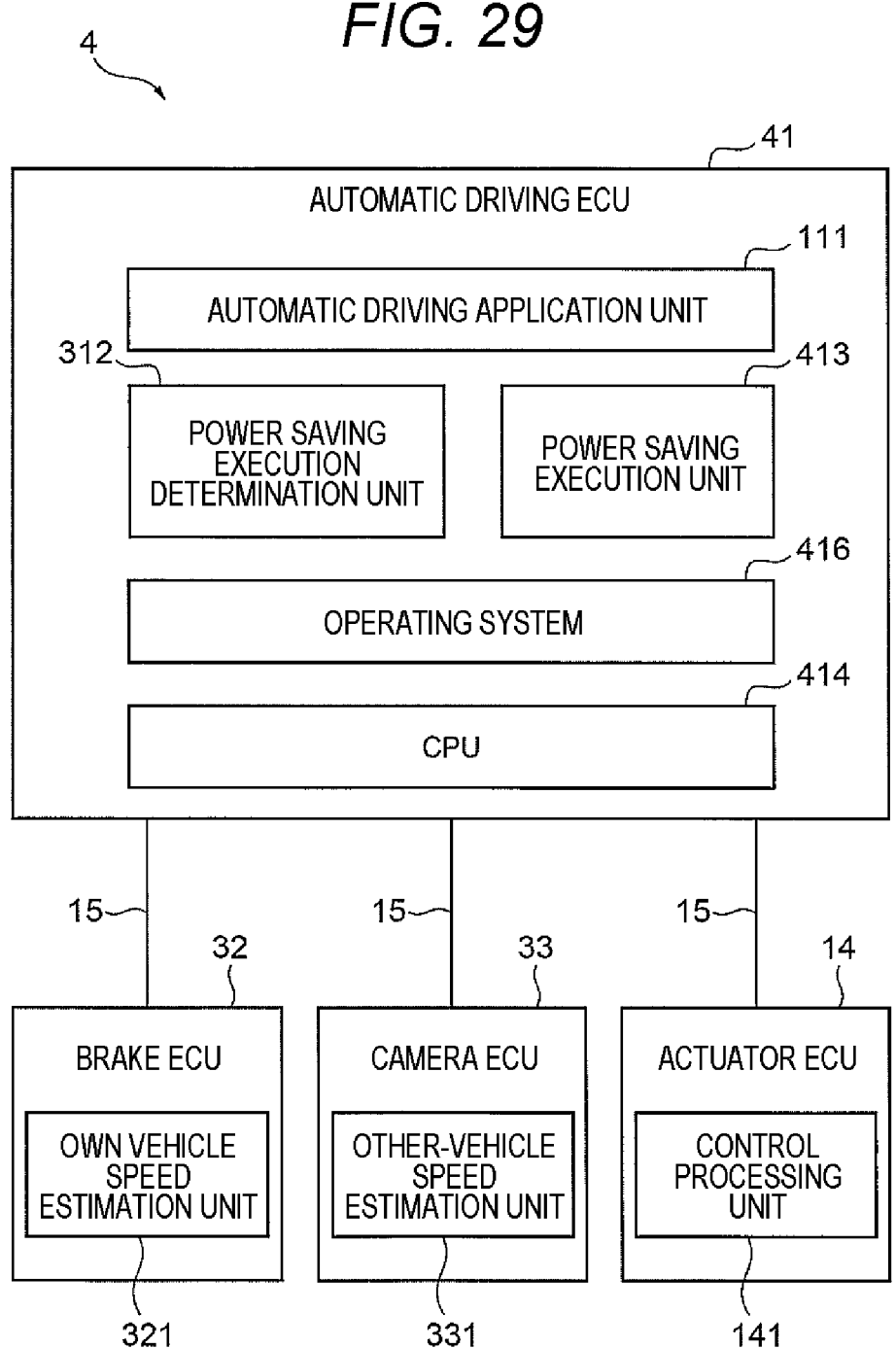
FIG. 29 is a configuration diagram of a system and a vehicle control device according to a fourth embodiment.

FIG. 29 is a configuration diagram of a system and a vehicle control device according to the fourth embodiment. A characteristic feature of the present embodiment is that, as the power saving control of the CPU 414, the execution cycle of the automatic driving application executed by the CPU 414 is made longer than that in the normal mode together with the instruction to decrease the frequency of the CPU 414. An automatic driving ECU 41 is equipped with a power saving execution unit 413 and an operating system 416 which have different algorithms. In the present embodiment, the same components as those of the embodiments described above are denoted by the same reference numerals, and a detailed description thereof will be omitted. In the present embodiment, the descriptions of FIGS. 21, 22, and 26 of the third embodiment will be cited.

Figure 30:
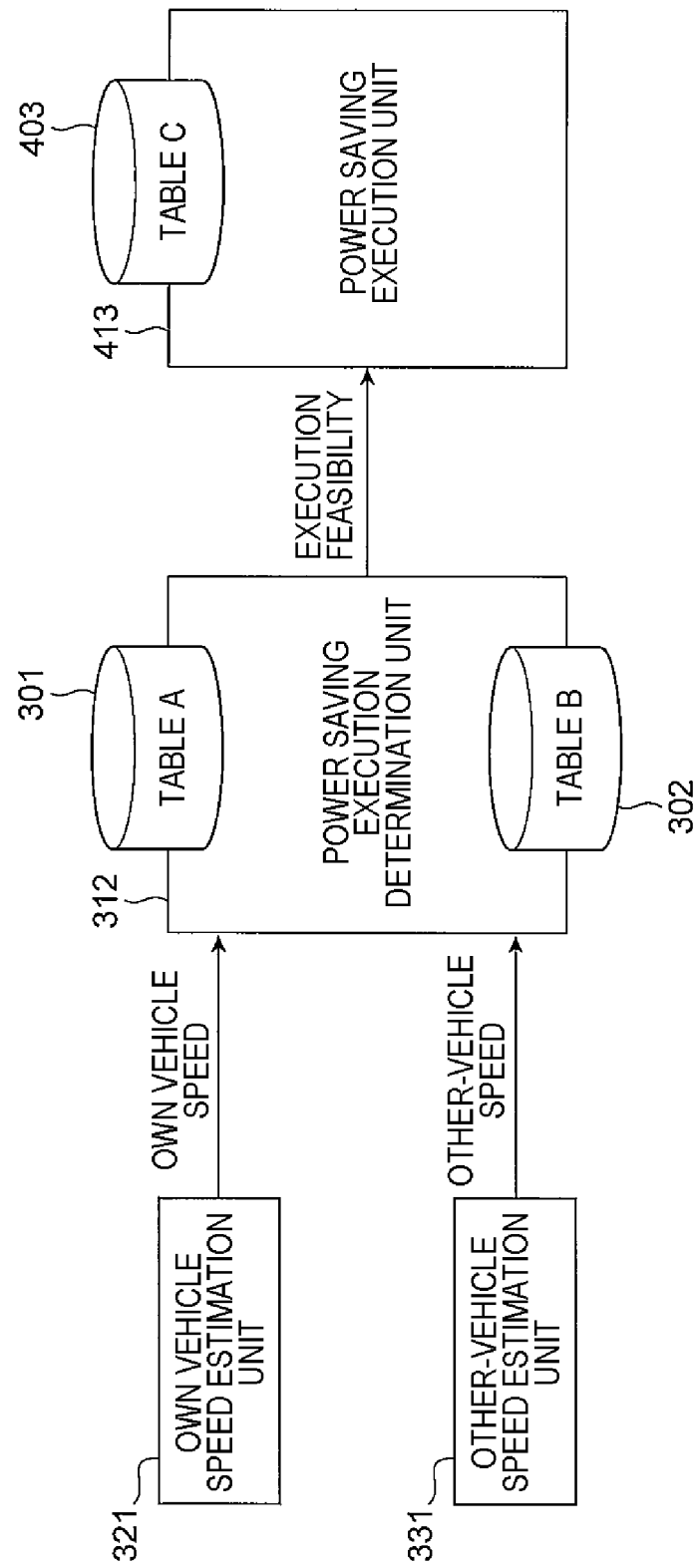
FIG. 30 is a processing flow of a system according to the fourth embodiment.

FIG. 30 illustrates a processing flow of the system according to the fourth embodiment. As a difference from the third embodiment, whether power saving is performed from the power saving execution determination unit 312 as an input of the power saving execution unit 413 is the same, but a power saving algorithm using the relationship table C 403 illustrated in FIG. 31 is different.

Figures 31, 32:
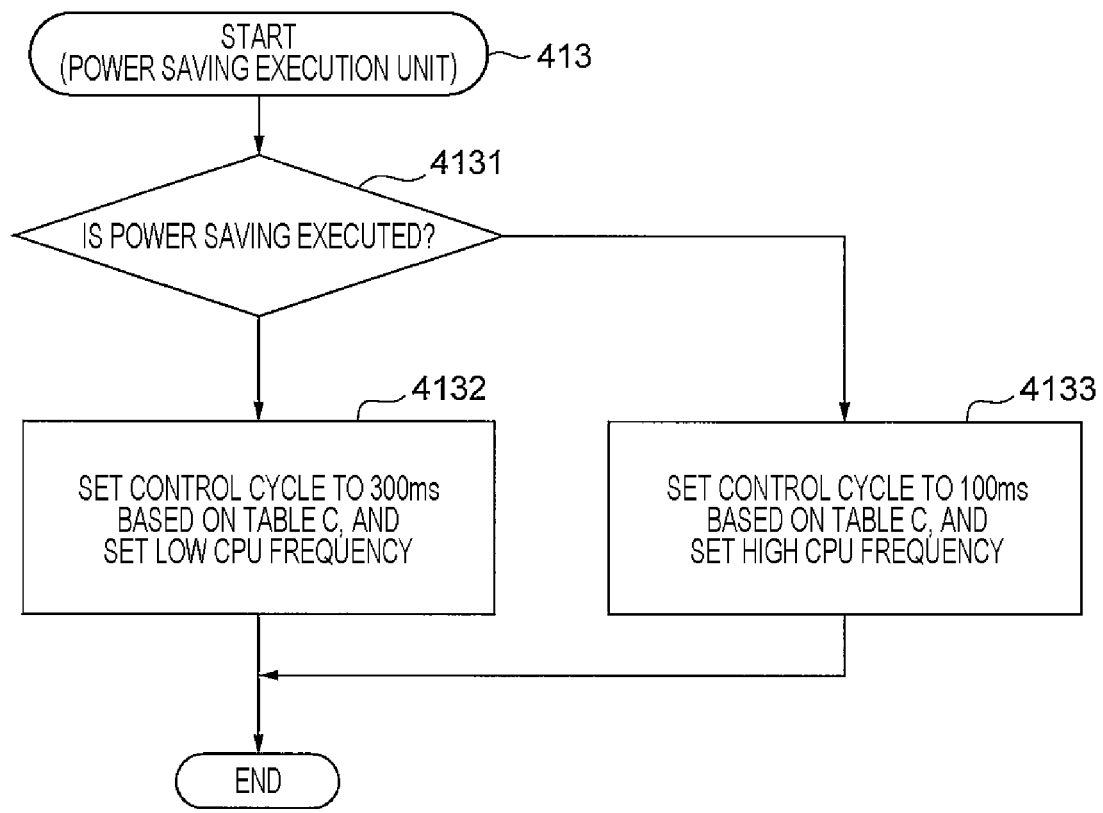
FIG. 31 is an example of a relationship table among a power saving determination result, a control cycle, and a CPU frequency according to the fourth embodiment.
FIG. 32 is an operation flow of a power saving execution unit according to the fourth embodiment.

FIG. 31 illustrates an example of the relationship table C among the power saving determination result, the control cycle, and the CPU frequency according to the fourth embodiment. The relationship table C 403 includes information on a power saving determination result, a control cycle, and a CPU frequency. According to this relationship table C 403, when power saving is possible, the CPU frequency is set to 0.8 GHz while the control cycle of the automatic driving application is changed to 300 ms. When the power saving is not possible, the CPU frequency is set to 1.5 GHz while the control cycle of the automatic driving application is changed to 100 ms.

Hereinafter, details of the operation flow according to the fourth embodiment will be described.

FIG. 32 illustrates an operation flow of the power saving execution unit 413 according to the fourth embodiment. Hereinafter, each step of FIG. 32 will be described.

(FIG. 32: Step 4131)

The power saving execution unit 413 determines whether the instructed input information is an instruction for transition to the power saving mode. If true, the process proceeds to Step 4132, and if false, the process proceeds to Step 4133.

(FIG. 32: Step 4132)

The power saving execution unit 413 changes the control cycle of the automatic driving application unit 111 from 100 ms to 300 ms based on the relationship table C 403, and sets a low CPU frequency.

(FIG. 32: Step 4133)

The power saving execution unit 413 changes the control cycle of the automatic driving application unit 111 from 300 ms to 100 ms based on the relationship table C 403, and sets a high CPU frequency.

Figure 33:
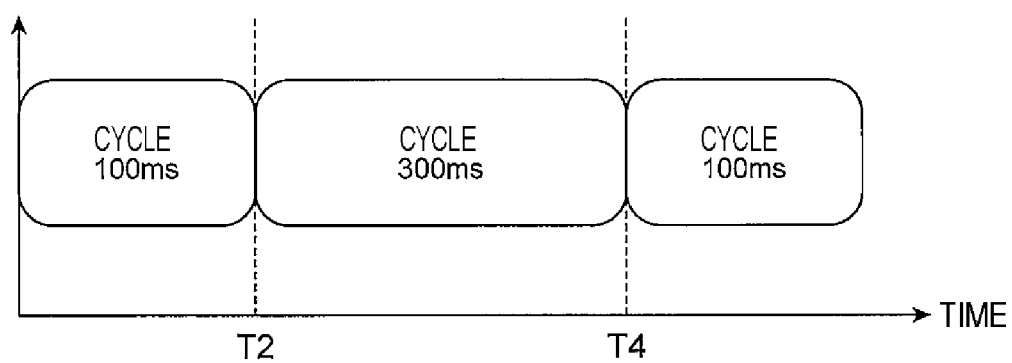
FIG. 33 is an example of transition of a control cycle in which an automatic driving application according to the fourth embodiment is executed.

FIG. 33 illustrates an example of transition of a control cycle in which the automatic driving application according to the fourth embodiment is executed. Since the shift to the power saving mode is completed at timing T2, the control cycle of the automatic driving application unit 111 is changed from 100 ms to 300 ms, and the CPU frequency is lowered. Then, since the release of the power saving mode is completed at timing T4, the control cycle of the automatic driving application unit 111 is returned from 300 ms to 100 ms, and the CPU frequency is returned to the original frequency.

According to the fourth embodiment, since the speeds of the own vehicle and other vehicles decrease at the time of traffic congestion, there is no sudden change in the surroundings of the own vehicle. Therefore, at the time of traffic congestion, even if the cycle (control cycle) for executing the determination processing is delayed within an allowable range, safety is not affected. The lengthening of the control cycle means that the number of executions per unit time is reduced, so that the CPU load can be reduced. Therefore, the power consumption can be reduced by reducing the CPU frequency in accordance with the change of the control cycle.

Note that the present invention is not limited to the above embodiments. For example, it may be detected that the number of objects to be recognized around is small by another method, or a traffic jam situation may be detected.

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 1 to 4 vehicle control device
11, 21, 31, 41 automatic driving ECU
112 power saving execution determination unit
113 power saving execution unit
114, 414 CPU
214 high-performance CPU
215 energy-saving CPU
311 fully-functioned automatic driving application unit
312 power saving execution determination unit
313 power saving execution unit
317 function-limited automatic driving application unit
413 power saving execution unit
416 operating system

The invention claimed is:

1. A vehicle control device having a CPU, the vehicle control device comprising:
 a power saving execution determination unit configured to determine a shift to or a release from a normal mode to a power saving mode in which power saving of the CPU is performed on a basis of a preset power saving condition; and
 a power saving execution unit configured to execute power saving control of the CPU by determining the shift to the power saving mode, and stop the power saving control of the CPU by determining the release of the power saving mode,
 wherein the power saving execution determination unit has a plurality of power saving conditions, and determines to shift to the power saving mode when all of the plurality of power saving conditions are satisfied, and determines to release the power saving mode when a state in which all of the plurality of power saving conditions are satisfied changes to a state in which at least some of the power saving conditions are not satisfied.

2. The vehicle control device according to claim 1, wherein
 a timing at which the power saving execution determination unit instructs the power saving execution unit to release the power saving mode is a timing at which returning from the power saving mode to the normal mode in the power saving execution unit can be completed before a processing load of the CPU exceeds a preset upper limit threshold.

3. The vehicle control device according to claim 1, comprising:
 a plurality of detection units configured to detect an external situation around an own vehicle, the plurality of detection units being configured to detect a same type or different types of events by algorithms different from each other,
 wherein the power saving execution determination unit is configured to determine a shift to or a release from the power saving mode on a basis of detection results by the plurality of detection units.

4. The vehicle control device according to claim 3, wherein
 the event includes at least one of a number of recognized objects around the own vehicle, information on a traffic volume, danger risk information indicating a past accident history, a potential accident risk, or the like, an own vehicle speed, an other-vehicle speed, external environment complexity obtained from a spatial frequency of image data, and information on a movement amount of another vehicle.

5. The vehicle control device according to claim 1, wherein
 a shift threshold and a release threshold of the power saving execution determination unit to the power saving mode are set to values at which an execution load of the CPU during a period when control processing satisfies a deadline or a certain period of time is less than 100%, and
 the power saving execution determination unit issues an instruction to release the power saving mode to the power saving execution unit when the release threshold is exceeded.

6. The vehicle control device according to claim 1, wherein
 as the power saving control of the CPU, the power saving execution unit is configured to reduce power consumption of the CPU by lowering a frequency of the CPU to be lower than that in a normal mode.

7. The vehicle control device according to claim 6, wherein
 as the power saving control of the CPU, the power saving execution unit is configured to switch an automatic driving application executed by the CPU to an automatic driving application having a function more limited than that in the normal mode together with an instruction to decrease a frequency of the CPU.

8. The vehicle control device according to claim 6, wherein
 as the power saving control of the CPU, the power saving execution unit is configured to make an execution cycle of the automatic driving application executed by the CPU longer than that in the normal mode together with an instruction to decrease the frequency of the CPU.

9. The vehicle control device according to claim 1, wherein
 a plurality of the CPUs is provided, and
 as the power saving control of the CPU, the power saving execution unit is configured to reduce power consumption of the CPU by stopping some of the plurality of CPUs.

10. The vehicle control device according to claim 9, wherein
 as the power saving control of the CPU, the power saving execution unit is configured to execute an automatic driving application on an unstopped CPU together with an instruction to stop the some of the CPUs.

11. The vehicle control device according to claim 9, wherein the CPU includes a high-performance CPU and an energy-saving CPU that consumes less power than the high-performance CPU, and the power saving execution unit is configured to cause the high-performance CPU to execute an automatic driving application in the normal mode, and cause the energy-saving CPU to execute an automatic driving application in the power saving mode.

12. The vehicle control device according to claim 1, wherein when power saving execution determination is made using two or more types of detection results, the power saving execution determination unit issues an instruction to shift to the power saving mode when at least two or more types of detection results determine that power saving is possible, and issues an instruction to release the power saving mode when the number of types of detection results determined that power saving is possible is less than two.

13. The vehicle control device according to claim 1, wherein the plurality of power saving conditions includes information on a situation of an external environment around an own vehicle and an operation amount of the CPU estimated from the situation.

* * * * *